United States Patent
Muetzel et al.

(10) Patent No.: US 7,367,918 B2
(45) Date of Patent: May 6, 2008

(54) METHOD FOR SELF-CONFIGURING AUTOMATED MECHANICAL TRANSMISSION AND ELECTRONIC CONTROLLER

(75) Inventors: Ronald P. Muetzel, Friedrichshafen (DE); Robert A. Sayman, Laurinburg, NC (US); James H. DeVore, Laurinburg, NC (US); Christopher B. Ross, Mt. Airy, GA (US)

(73) Assignee: ZF Friedrichshafen AG, Friedrichshafen (DE)

( * ) Notice: Subject to any disclaimer, the term of this patent is extended or adjusted under 35 U.S.C. 154(b) by 240 days.

(21) Appl. No.: 11/269,198

(22) Filed: Nov. 8, 2005

(65) Prior Publication Data

US 2007/0105688 A1 May 10, 2007

(51) Int. Cl.
*B60W 10/10* (2006.01)
*G06F 7/04* (2006.01)
(52) U.S. Cl. .................. 477/33; 74/335; 701/51
(58) Field of Classification Search ............ 477/34; 701/51; 74/335
See application file for complete search history.

(56) References Cited

U.S. PATENT DOCUMENTS

| 5,123,301 | A | * | 6/1992 | Hagele et al. ............ 477/121 |
| 5,436,837 | A | | 7/1995 | Gerstung et al. |
| 5,440,487 | A | | 8/1995 | Althoff et al. |
| 5,528,932 | A | | 6/1996 | Bauer et al. |
| 6,553,290 | B1 | | 4/2003 | Pillar |
| 6,704,628 | B1 | | 3/2004 | Fennel et al. |
| 6,874,383 | B2 | * | 4/2005 | Sayman et al. ............ 74/335 |
| 6,931,924 | B1 | | 8/2005 | Henneken |
| 2001/0016791 | A1 | | 8/2001 | Bolzmann et al. |
| 2001/0037697 | A1 | * | 11/2001 | Nanri et al. .............. 74/335 |
| 2002/0116093 | A1 | | 8/2002 | Aldrich, III et al. |
| 2003/0074118 | A1 | | 4/2003 | Rogg et al. |

FOREIGN PATENT DOCUMENTS

| DE | 19506296 | 4/1996 |
| DE | 10036415 | 11/2001 |
| GB | 2298252 | 8/1996 |
| JP | 11351377 | 12/1999 |

* cited by examiner

*Primary Examiner*—Ha D. Ho
(74) *Attorney, Agent, or Firm*—Brinks Hofer Gilson & Lione

(57) ABSTRACT

A method for self configuring automated mechanical transmissions (AMT) and electronic control units (ECU) ensures compatibility therebetween. The method comprehends undertaking a program or subroutine when the vehicle is first powered up which moves the shift operators into a predetermined position. The shift operators include full stroke sensors. Depending upon differences between the commanded shift pattern and the actual shift pattern of the transmission, the specific type of transmission, for example, a twelve speed or a sixteen speed, can be determined.

20 Claims, 5 Drawing Sheets

US 7,367,918 B2

METHOD FOR SELF-CONFIGURING AUTOMATED MECHANICAL TRANSMISSION AND ELECTRONIC CONTROLLER

BACKGROUND OF THE INVENTION

The invention relates generally to a method for self-configuring automated mechanical truck transmissions and controller and more particularly to a method for self-configuring and checking compatibility between automated mechanical truck transmissions and electronic controllers.

Initially, heavy duty truck transmissions included manually, i.e., operator adjusted, devices including a hand operated gear shift and a foot operated master friction clutch. This operational configuration remained essentially unchanged for many years after the advent of motor vehicles.

During the last few decades, manual, i.e., operator control, of the gear shift and master clutch of heavy duty vehicles such as trucks has become increasingly automated to the point today where an electronic control unit (ECU) provided with data from various speed and position sensors controls selection of gear ratios in the main transmission and auxiliary units such as splitters and planetary gear units as well as engagement and disengagement of the master friction clutch. Both the automated transmissions and electronic control units have become increasingly sophisticated during this time.

Modern day electronic control units are particularly complex memory and processing units which may be flashed with current software subroutines, lookup tables and the like which are then mated with an appropriate, compatible transmission. It is, of course, desirable to properly mate such software and hardware in order to ensure compatibility therebetween. It is also desirable to detect and ensure this compatibility even before the vehicle is mechanically powered up and driven. This is especially necessary since there is often little physical evidence or manner of determining the software loaded into an electronic controller by any reasonable, physical or electrical examination or test.

The present invention addresses this challenge and provides a detection subroutine which provides information to the electronic controller regarding an identifiable variable of the transmission which indicates its particular type and thus confirms or does not confirm compatibility between the electronic control unit and its software and the transmission.

SUMMARY OF THE INVENTION

An apparatus and method for self configuring automated mechanical transmissions (AMT) and electronic control units (ECU) ensures compatibility therebetween. The method comprehends undertaking a program or subroutine when the vehicle is first powered up which moves the shift rail operators through a predetermined series of positions. The shift actuators include full stroke sensors which are capable of detecting motion in the XY plane of the main gear box operators. Depending upon differences between the commanded shift pattern and the actual shift pattern of the particular transmission being checked, the specific type of transmission, for example, a twelve speed or a sixteen speed can be determined. If the electronic controller and transmission are not compatible, i.e. the transmission in a twelve speed and the electric controller is a sixteen speed, a fault or shutdown signal is generated.

Thus it is an object of the present invention to provide a method for ensuring compatibility between an electronic control unit and automatic mechanical transmission.

It is a still further object of the present invention to provide a method for determining the identity or configuration of a motor vehicle transmission by commanding certain gear shifts and monitoring the activity of the transmission shifts.

It is a still further object of the present invention to provide a method for determining the configuration of an automated mechanical transmission by providing software which commands certain shifts which reveal the configuration and identify of the transmission.

Further objects and advantages of the present invention will become apparent by reference to the following description of the preferred embodiment and appended drawings wherein like reference numbers refer to the same component, element or feature.

DESCRIPTION OF PREFERRED EMBODIMENT

Figure 1:
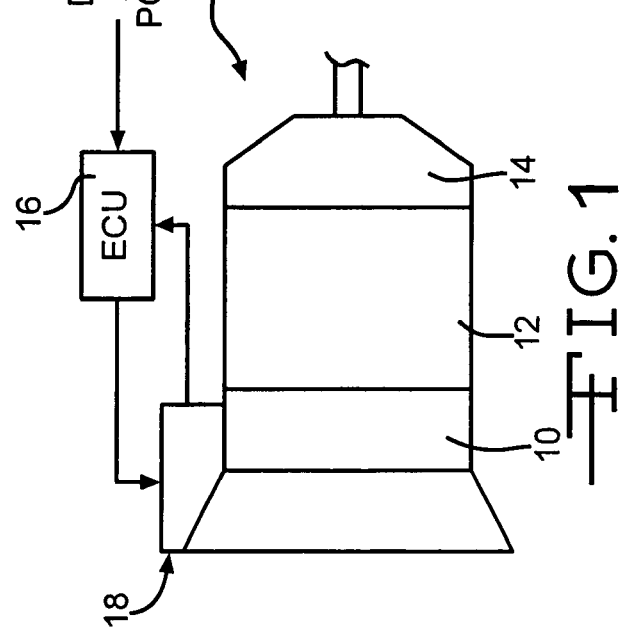
FIG. 1 is a diagrammatic view of a typical twelve or sixteen speed heavy duty transmission and electronic control unit incorporating the present invention.

Referring now to FIG. 1, an automated mechanical transmission incorporating the present invention is diagrammatically illustrated and generally designated by the reference number 8. The automated mechanical transmission 8 includes a splitter or two speed gear box 10 which is driven by the master friction clutch (not illustrated) and which drives a main or primary three or four (forward) speed gear box 12 which, in turn, drives a planetary two speed gear box 14. A housing receives, mounts and protects these aforementioned gear boxes 10, 12 and 14.

An electronic control unit (ECU) 16 includes software, lookup tables, memory and the like, receives data from the vehicle operator and various vehicle and drive train sensors and provides control signals to, inter alia, a shift operator assembly 18.

Figure 2:
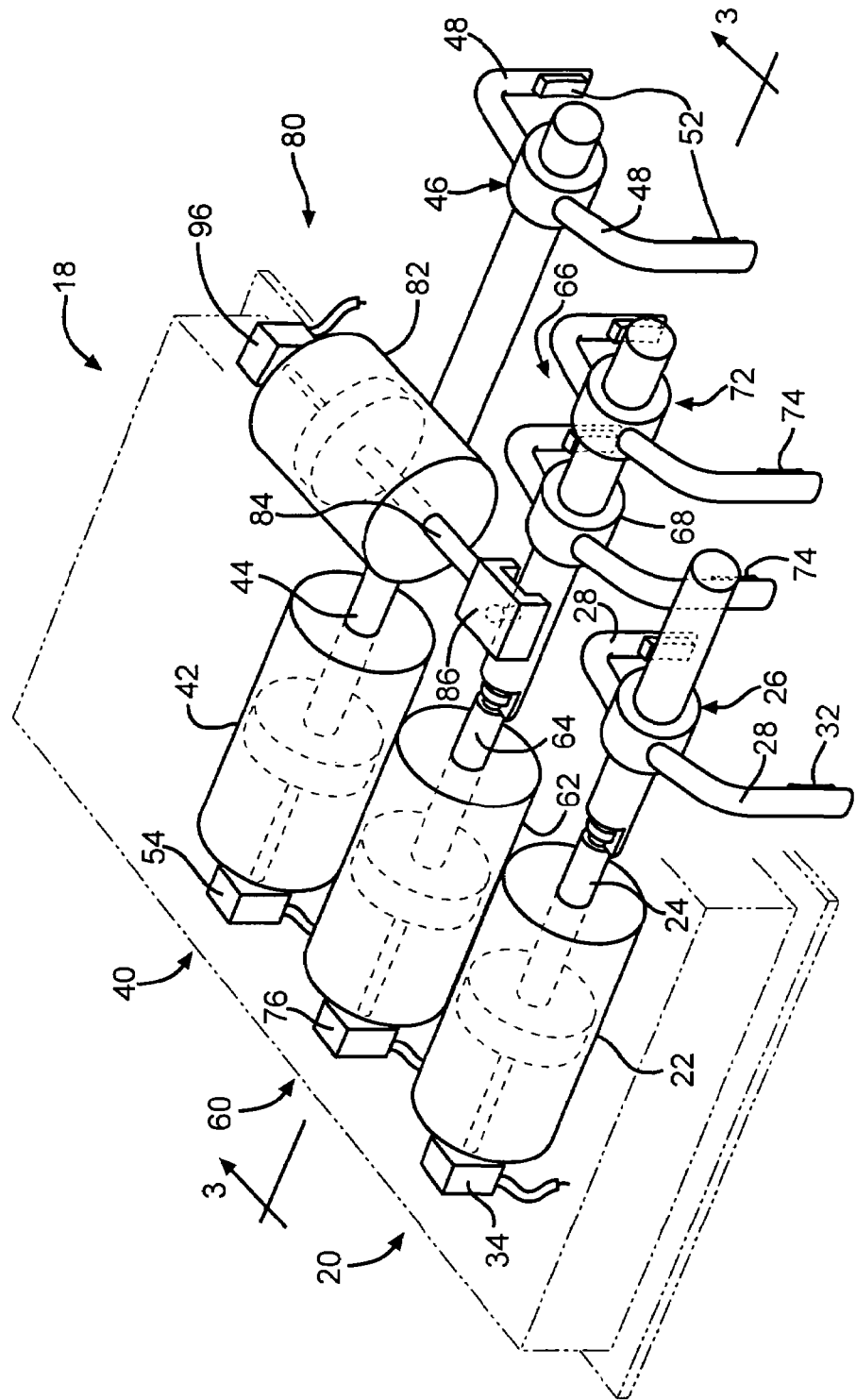
FIG. 2 is a diagrammatic perspective view of a shift operator assembly of an automated mechanical transmission incorporating the present invention.

Referring now to FIG. 2, the shift operator assembly 18 includes a splitter shift assembly 20 having a first longitudinally oriented cylinder 22 which receives a first double acting piston and shift rod assembly 24 to which is secured a splitter shift fork 26. The splitter shift fork 26 is conventional and defines two arms 28 which include suitably configured engagement structures 32 which engage and translate gears of the splitter or first gear box 10 of the transmission 8. The first piston and shift rod assembly 24 translates between a forward, engaged position a center or intermediate neutral position and a rearward, engaged position. A first linear sensor or transducer 34 associated with the first cylinder 22 provides an output representing the current or real time position of the first piston and shift rod assembly 24.

The shift operator assembly 18 also includes a planetary shift assembly 40 which includes a second longitudinally oriented cylinder 42 which receives a second double acting piston and shift rod assembly 44 which terminates in a planetary shift fork 46. Once again, the shift fork 46 is conventional and includes a pair of arms 48 which terminate in gear engaging structures 52 which change the gear speed ratio of the planetary two speed gear box 14 disposed at the rear of the transmission 8. The second piston and shift rod assembly 44 translate between a forward, engaged position, a center or intermediate neutral position and a rearward, engaged position. A second linear sensor or transducer 54 associated with the second cylinder 42 provides a second output representing the current or real time position of the second piston and shift rod assembly 44.

Intermediate the splitter shift assembly 20 and the planetary shift assembly 40 is an engage or main gear box shift assembly 60. The engage or main gear box shift assembly 60 likewise includes a third cylinder 62 which receives a third double acting piston and shift rod assembly 64 which is translated axially between a forward, engaged position, a center or intermediate neutral position, and a rearward, engaged position. Axial translation of the third piston and shift rod assembly 64 similarly translates a main shift fork assembly 66. The main shift fork assembly 66 includes a forward and rearward pair of shift forks 68 and 72 which likewise include gear engaging structures 74. A third linear sensor or transducer 76 associated with the third cylinder 62 provides a third output representing the current or real time position of the third piston and shift rod assembly 64.

Figure 3:
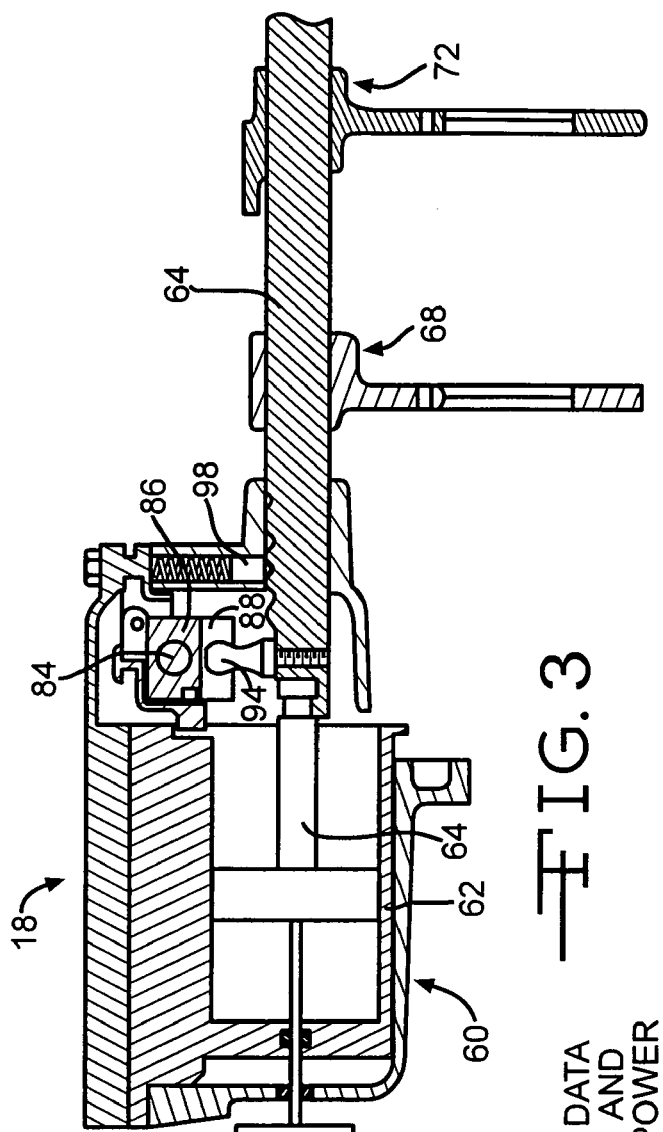
FIG. 3 is a full, sectional view of the main gear box engage operator of an automated mechanical transmission incorporating the present invention taken along line 3-3 of FIG. 2.

Referring now to FIGS. 2 and 3, in addition to axial translation, the third piston and shift rod assembly 64 are capable of limited rotation about its longitudinal axis. Such rotation is achieved by the action of an select shift assembly 80. The select shift assembly 80 includes a fourth cylinder 82 transversely oriented which receives a fourth transversely oriented piston and shift rod assembly 84 which terminates in a U-shaped operator or actuator block 86 which defines a slot 88. The slot is oriented longitudinally and moves transversely relative to the third piston and shift rod assembly 64. Received within the slot 88 of the block 86 is an actuating or register pin 92 which extends radially from the third piston and shift rod assembly 64. Accordingly, as the fourth piston and shift rod assembly 84 as well as the actuator block 86 translate along their axis, motion of the actuating pin 92 within the slot 88 causes limited rotation of the third piston and shift rod assembly 64 about its longitudinal axis. The fourth piston and shift rod assembly 84 translate between a left position, a center or intermediate position and a right position. A fourth linear sensor or transducer 96 associated with the fourth cylinder 82 provides a fourth output representing the current or real time position of the fourth piston and shift rod assembly 84. The three positions of the select shift assembly 80 or engage coupled with the forward, center and rearward positions of the main shift assembly 60, provide or are capable of providing nine distinct positions. Suitable detent mechanisms 98 provide longitudinally detented positions along the third piston and shift rod assembly 64 as well as the other shift rod assemblies 24 and 44.

Figure 4:
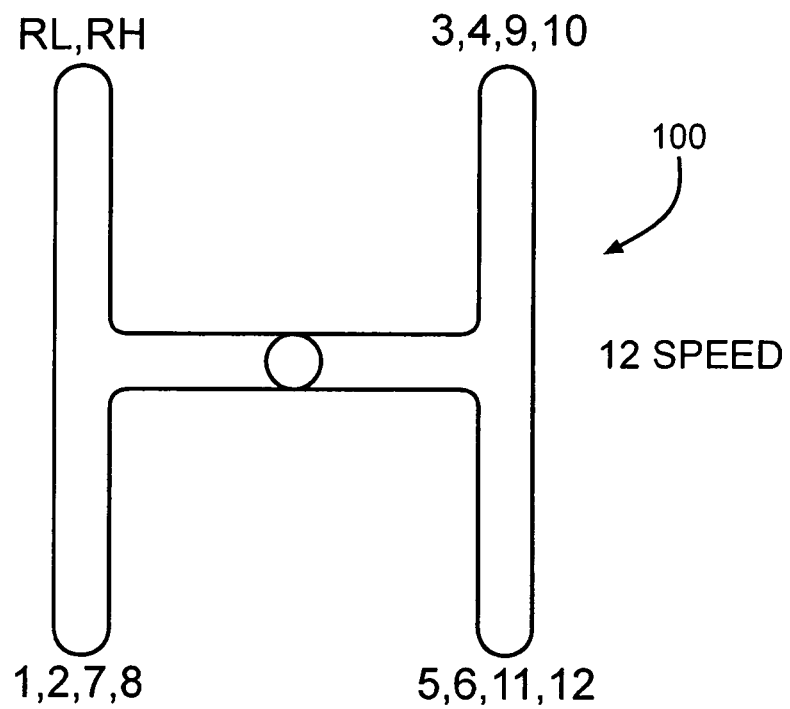
FIG. 4 is the shift pattern of a typical twelve speed transmission incorporating the present invention.

Turning now to FIG. 4, a typical shift pattern for a twelve speed truck transmission is schematically illustrated and designated by the reference number 100. The shift pattern 100 of the main shift assembly 60 and the select shift assembly 80 is defined as an "H". At the upper left corner of the shift pattern 100 is reverse gear, which is engaged when the main or engage shift assembly 60 is in its forward position and the select shift assembly 80 is in its left position. Selection of reverse high (RH) or reverse low (RL) is achieved by selecting between the two gear ratios provided by the splitter shift assembly 20. First gear and related gears ($2^{nd}$, $7^{th}$ and $8^{th}$) are achieved (from reverse) by no action of the select shift assembly 80 and moving the main or engage shift assembly 60 to its rear position. Neutral is achieved when both of these shift assemblies are in or are moved to their centered positions. Third gear and related gears ($4^{th}$, $9^{th}$ and $10^{th}$) are achieved (from the first gear position) when the select shift assembly 80 retracts to the right and the main or engage shift assembly 60 is moved forward. Fifth gear and related gears ($6^{th}$, $11^{th}$ and $12^{th}$) are achieved from the third and related gear position without action of the select shift assembly 80 while the main or engage shift assembly 60 moves to the rear. Selection of adjacent gear ratios in a given position of the main gear box 12 such as $1^{st}$ and $2^{nd}$ gear, $9^{th}$ and $10^{th}$ or $5^{th}$ and $6^{th}$ will typically be achieved by operation of the splitter shift assembly 20.

Figure 5:
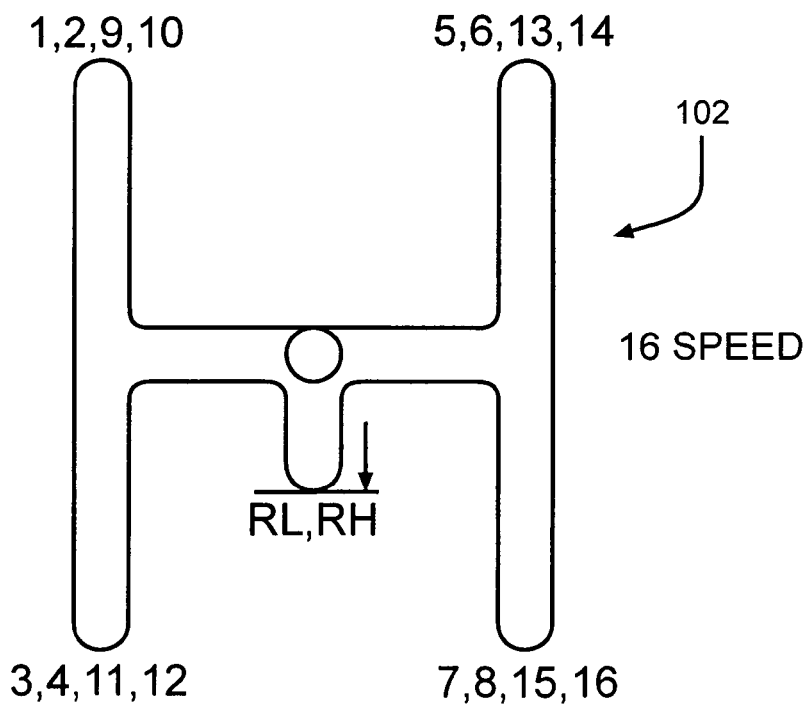
FIG. 5 is the shift pattern of a typical sixteen speed transmission incorporating the present invention.

The conventional twelve speed transmission shift pattern 100 illustrated in FIG. 4 should be contrasted with the conventional sixteen speed transmission shift pattern 102 illustrated in FIG. 5. Here, in the upper left corner of the shift pattern is first gear and related gears ($2^{nd}$, $9^{th}$ and $10^{th}$). To the lower left of the shift pattern 102 is third and related gears ($4^{th}$, $11^{th}$ and $12^{th}$). In the upper right corner of the shift pattern 102 is fifth and related gears ($6^{th}$, $13^{th}$ and $14^{th}$) and in the lower right corner of the shift pattern 102 is seventh and related gears ($8^{th}$, $15^{th}$ and $16^{th}$). Both high and low reverse gears are engaged by moving the select shift assembly 80 to its center position and then moving the main shift assembly 60 to its rear position.

Figure 6:
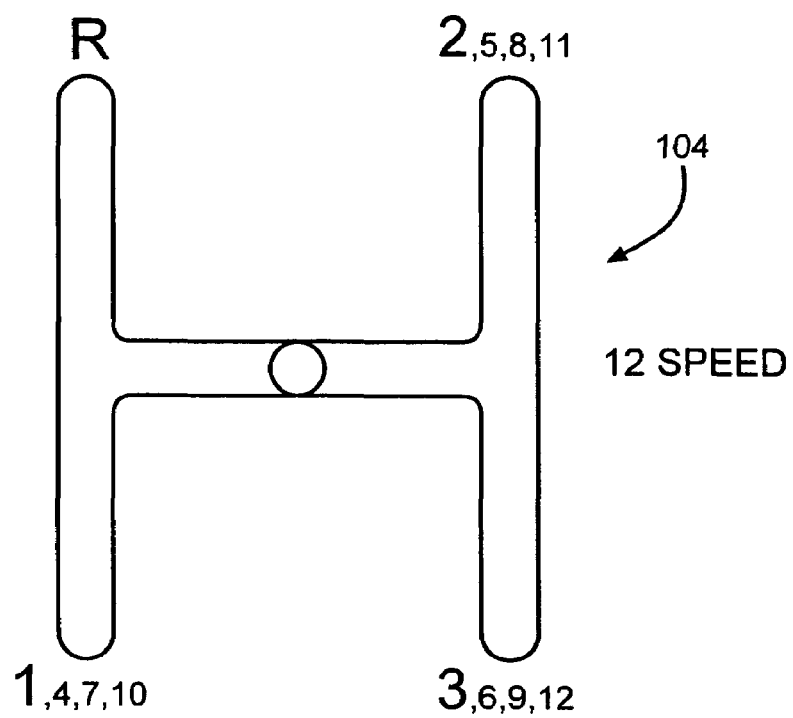
FIG. 6 is an alternative shift pattern of a twelve speed transmission incorporating the present invention.

Turning now to FIG. 6, an alternative shift pattern for a twelve speed truck transmission is schematically illustrated and designated by the reference number 104. The shift pattern 104 of the main shift assembly 60 and the select shift assembly 80 is defined as an "H". At the upper left corner of the shift pattern 104 is reverse gear, which is engaged when the main or engage shift assembly 60 is in its forward position and the select shift assembly 80 is in its left position. First gear and related gears ($4^{th}$, $7^{th}$ and $11^{th}$) are achieved (from reverse) by no action of the select shift assembly 80 and moving the main or engage shift assembly 60 to its rear position. Neutral is achieved when both of these shift assemblies are in their centered positions. Third gear and related gears ($5^{th}$, $8^{th}$ and $11^{th}$) are achieved (from first gear) when the select shift assembly 80 retracts to the right and the main or engage shift assembly 60 is moved forward. Third gear and related gears ($6^{th}$, $9^{th}$ and $12^{th}$) are achieved (from second gear) without action of the select shift assembly 80 while the main or engage shift assembly 60 moves to the rear.

Figure 7:
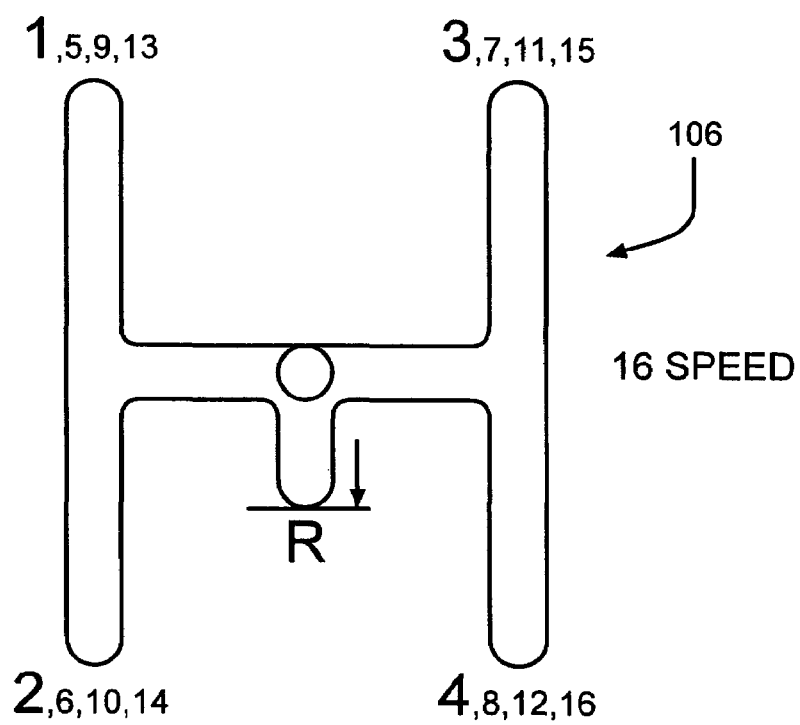
FIG. 7 is an alternative shift pattern of a sixteen speed transmission incorporating the present invention.
Figure 8:
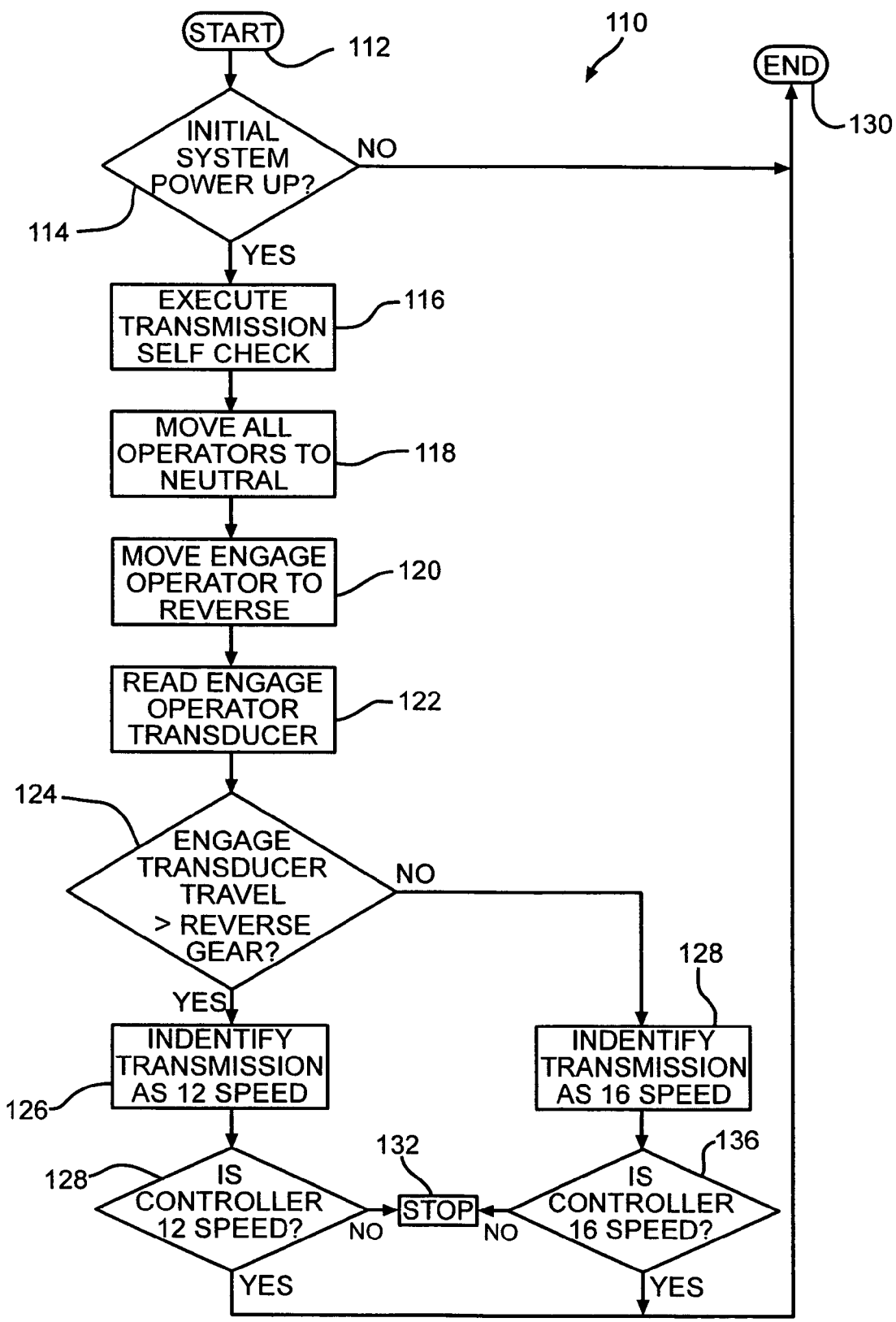
FIG. 8 is a computer software flowchart of the automated mechanical transmission self configuration method according to the present invention.

The alternative twelve speed transmission shift pattern 104 illustrated in FIG. 6 should be contrasted with an alternative sixteen speed transmission shift pattern 106 illustrated in FIG. 7. Here, in the upper left corner of the shift pattern is first gear and related gears ($5^{th}$, $9^{th}$ and $13^{th}$). To the lower left of the shift pattern 106 is third and related gears (6$^{th}$, 10$^{th}$ and 14$^{th}$). In the upper right corner of the shift pattern 106 is fifth and related gears (7$^{th}$, 11$^{th}$ and 15$^{th}$) and in the lower right corner of the shift pattern 106 is seventh and related gears (8$^{th}$, 12$^{th}$ and 16$^{th}$). Reverse is engaged by moving the select shift assembly 80 to its center position and then moving the main shift assembly 60 to its rear position.

Comparison of these four shift patterns reveals that whereas the upper left corner of the twelve speed shift patterns 100 and 104 is reverse gear, the upper left position of the sixteen speed transmission shift patterns 102 and 106 is first gear.

The consequence of these situations is that if an electronic controller configured and intended for use with a twelve speed transmission is inadvertently installed with a sixteen speed transmission first gear will be engaged when reverse was commanded and intended. Given the opposite situation (a sixteen speed controller installed with a twelve speed transmission) when first gear is requested, reverse will be selected. Even during initial power up and test of the vehicle, such unexpected motion in a direction opposite that intended and expected is to be avoided. The present invention cooperates with the automated shift assembly 18 to detect, the first time the vehicle is powered up, the shift pattern of the transmission 8 to ascertain that the electronic control unit 16 for a twelve or sixteen speed transmission is properly mated to a twelve or sixteen speed transmission.

This self-check or self-configuration is achieved by detecting the physically different shift pattern 102 of the sixteen speed transmission which includes a center, reverse position whereas a twelve speed transmission shift pattern 100 defines a conventional four cornered "H" pattern. In fact, determination of the difference between a twelve speed or a sixteen speed transmission is based upon the fact that center, rearward motion of the main (engage) and select shift assemblies 60 and 80 will engage reverse in a sixteen speed transmission and thus the operators will experience or achieve only a finite amount of travel which selects reverse gear. By contrast, in a twelve speed transmission, if the shift assemblies 60 and 80 are centered and then moved rearward, there will be no feature or structure which will impede motion and the main or engage shift assembly 60 will translate to the full extent of its travel, thereby evidencing that no reverse gear may be or was engaged and thereby identifying the transmission as a twelve speed transmission.

It will be appreciated that this invention may be utilized in any type of mechanical device wherein pneumatic, hydraulic or electric actuators associated with respective linear transducers or sensors are utilized to translate components or structures along one or multiple axes. When travel along a certain axis or combination of axes exceeds that which is possible with a given component or type of component, such additional motion may therefore be interpreted as representing another component as well as a fault of failure of the given component.

Referring now to FIG. 6, a flow chart for a computer self-configuration or identification program or software 110 incorporating the present invention is illustrated. The program 110 commences with a start instruction 112 which initializes and clears any data registers. The program 110 then moves to a decision point 114 which inquires whether this is the initial system power up, that is, whether this is the first time the vehicle and specifically the transmission and electronic control unit. If it is not, the decision point 114 is exited at NO and the program terminates at end point 130. If this is the initial system power up, the decision point 114 is exited YES and the program 110 moves to a process step 116 which commences execution of the transmission and shift assembly self check. The first step of the self check is to move all four operators, the operators for the splitter, the planetary and the main or engage and select cylinders to neutral, i.e., their center positions. Alternatively, at least the engage or main and select shift assemblies 60 and 80 must be moved to neutral as the self-configuration or identification program 110 does not involve action or positions of the splitter or planetary shift assemblies 20 and 40.

Next, the program 110 moves to a process step 120 which commences motion of the main or engage shift assembly 60 toward the reverse gear of a sixteen speed transmission as illustrated is FIG. 5. After the main or engage shift assembly 60 has engaged reverse or while such motion is occurring, the process step 122 may be undertaken which reads the output of the third transducer 76 of the main or engage shift assembly 60 to determine the extent of travel of the engage or main piston and shift rod assembly 64. Next, a decision point 124 is entered which inquires whether the travel of the third or engage transducer 76 (and the main piston and shift rod assembly 64) was greater than that expected to place a sixteen speed transmission into reverse gear.

If the travel is greater than that associated with placing a sixteen speed transmission in reverse gear, the decision point 124 is exited at YES and the program 110 identifies or sets a flag that designates the transmission 8 with which the electronic control unit 16 is associated as a twelve speed transmission. The program 110 now moves to a decision point 128 which inquires whether the electronic control unit 16 with which the present transmission 8 is associated is a twelve speed controller. If it is, the decision point 128 is exited at YES and the program 110 terminates at the step 130. If the electronic control unit 16 is not a twelve speed controller, the decision point 128 is exited at NO and a process step 132 defaults and/or stops the self-check program 110 as there is an incompatibility between the transmission 8 and the electronic control unit 16.

Alternatively, the decision point 124 is exited at NO if the translation of the third or engage transducer 76 is less than or equal to the travel required to achieve reverse gear. In this instance, the transmission 8 is a sixteen speed transmission and the program 110 enters a process step 134 which identifies or sets a flag with the electronic control unit 16 which indicates that the transmission 8 is a sixteen speed transmission. Then the program 110 moves to a decision point 136 which inquires whether the electronic control unit 16 associated with the particular transmission 8 undergoing the self-check is a sixteen speed control unit. If it is, there is compatibility between the two units, the decision point 136 is exited at YES and the program 110 terminates at the end point 130. If the electronic control unit 16 is not a sixteen speed controller, the decision point 136 is exited at NO and the program 110 defaults and/or stops at the process step 132. A fault light or other indicator (not illustrated) of the incompatibility may be illuminated or provided at the process step 132 or data may be provided in some other fashion such as a test printout to indicate the incompatibility between the transmission 8 and the electronic control unit 16.

Alternatively, if the electronic control unit 16 has sufficient memory and computing capability that it may operate with both a twelve speed transmission and a sixteen speed transmission, the flags set in the process steps 126 and 134 may be read by the electronic control unit 16. If the flag for a twelve speed transmission is set, all subsequent shift commands will be based upon the shift pattern 100 illustrated in FIG. 4 relating to a twelve speed transmission. If the flag indicating a sixteen speed transmission is set in the process step 134, all subsequent shift commands are then based upon and utilize the shift pattern 102 appearing in FIG. 5.

The foregoing disclosure is the best mode devised by the inventors for practicing this invention. It is apparent, however, that methods and apparatus incorporating modifications and variations will be obvious to one skilled in the art of automated mechanical transmissions and electronic controllers. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A method of ensuring proper automated mechanical transmission and electronic control unit association in a vehicle, comprising the steps of:
   providing a plurality of actuators for translating gear selecting components of a transmission into predetermined positions,
   providing a plurality of sensors capable of sensing such translation,
   providing a controller having a program for selecting at least one predetermined gear position,
   executing said program and comparing data from at least one of said sensors with a predetermined value stored in said controller regarding said predetermined gear position selection, and
   determining a first transmission type if said data is indicative of translation that is less than or equal to said predetermined value and a second transmission type if said data is indicative of translation that is greater than said predetermined value.

2. The method of ensuring proper transmission and control unit association of claim 1 further including the step of terminating operation when an incompatibility is detected.

3. The method of ensuring proper transmission and control unit association of claim 2 wherein said incompatibility is between said transmission and said control unit.

4. The method of ensuring proper transmission and control unit association of claim 2 wherein said incompatibility relates to gear shift patterns.

5. The method of ensuring proper transmission and control unit association of claim 1 further including the step of selecting software in said controller compatible with said determined transmission type.

6. The method of ensuring proper transmission and control unit association of claim 1 wherein said transmission type is one of a twelve speed transmission and a sixteen speed transmission.

7. The method of ensuring proper transmission and control unit association of claim 1 wherein said at least one predetermined gear position is reverse.

8. A method for determining compatibility between a multiple speed automated mechanical transmission and an electronic control unit comprising the steps of:
   providing a multiple speed transmission having a shift operator assembly including a plurality of actuators and associated position sensors having outputs,
   providing an electronic control unit having a program comprising the steps of:
      commanding one of said actuators to move to a shift position which selects an operating gear in a first type of transmission and selects a non-gear position in a second type of transmission,
      determining translation of said moving actuator by reading an output of one of said position sensors associated with said moving actuator,
      comparing said translation of said position sensor with a predetermined value associated with selecting said operating gear in said first type of transmission, and
      identifying said transmission as the first type if said translation is less than or equal to said predetermined value and identifying said transmission as the second type if said translation is greater than said predetermined value.

9. The method for determining compatibility between a transmission and a control unit of claim 8 wherein said first transmission is a sixteen speed transmission and said second transmission is a twelve speed transmission.

10. The method for determining compatibility between a transmission and a control unit of claim 8 further including the step of terminating operation when an incompatibility is detected.

11. The method for determining compatibility between a transmission and a control unit of claim 10 wherein said incompatibility is between said transmission and said control unit.

12. The method for determining compatibility between a transmission and a control unit of claim 10 wherein said incompatibility relates to gear shift patterns.

13. The method for determining compatibility between a transmission and a control unit of claim 8 further including the step of selecting software in said control unit compatible with said identified transmission type.

14. A method of determining compatible assembly of a transmission with an electronic control unit, comprising the steps of:
   providing a transmission with at least one gear selecting operator having an associated motion transducer,
   providing a controller for receiving a signal from said transducer and controlling said operator,
   commanding said operator to move to a predetermined gear,
   reading the motion of said transducer,
   determining a first transmission type if said motion is less than or equal to a predetermined value and a second transmission type if said motion is greater than said predetermined value.

15. The method of determining compatible assembly of claim 14 further including the step of terminating operation of said transmission and electronic control unit if one of said first and second types of transmission is incompatible with said electronic control unit.

16. The method of claim 14 wherein said predetermined gear is reverse gear.

17. The method of determining compatible assembly of claim 14 further including the step of configuring said electronic control unit to be compatible with said determined transmission type.

18. The method of determining compatible assembly of claim 14 wherein said transmission type is one of a twelve speed transmission and a sixteen speed transmission.

19. The method of determining compatible assembly of claim 14 further including the step of terminating operation of said transmission and said electronic control unit when an incompatibility is detected.

20. The method of determining compatible assembly of claim 19 wherein said incompatibility relates to a gear shift pattern.

* * * * *